United States Patent [19]

Füldner

[11] Patent Number: 5,014,215
[45] Date of Patent: May 7, 1991

[54] PROCESS FOR EVALUATING SIGNALS FROM AN INCREMENTAL TRANSMITTER

[75] Inventor: Friedrich Füldner, Villingen-Schwenningen, Fed. Rep. of Germany

[73] Assignee: Deutsche Thomson-Brandt GmbH, Villingen-Schwenningen, Fed. Rep. of Germany

[21] Appl. No.: 299,804
[22] PCT Filed: May 10, 1988
[86] PCT No.: PCT/EP88/00407
§ 371 Date: Jan. 6, 1989
§ 102(e) Date: Jan. 6, 1989
[87] PCT Pub. No.: WO88/09481
PCT Pub. Date: Dec. 1, 1988

[30] Foreign Application Priority Data

May 23, 1987 [DE] Fed. Rep. of Germany .... 3717473.8

[51] Int. Cl.$^5$ ............................................. G01R 29/02
[52] U.S. Cl. ..................................... 364/486; 364/574
[58] Field of Search .................. 318/568.22; 328/133; 364/701, 835, 167.01, 559, 571.06, 486; 341/11, 16; 73/1 E

[56] References Cited

U.S. PATENT DOCUMENTS

| | | | |
|---|---|---|---|
| 3,998,088 | 12/1976 | Kazangey | 364/701 |
| 4,123,750 | 10/1978 | Leney et al. | 364/167.01 |
| 4,308,500 | 12/1981 | Avins | 328/133 |
| 4,486,845 | 12/1984 | Duckworth | 364/559 |
| 4,534,004 | 8/1985 | Vollmayr | 364/486 |
| 4,578,748 | 3/1986 | Abe et al. | 364/167.01 |
| 4,669,042 | 5/1987 | Henderson et al. | 364/167.01 |

FOREIGN PATENT DOCUMENTS 0076861 4/1983 European Pat. Off. .
2532132 2/1984 France .

Primary Examiner—Kevin J. Teska
Attorney, Agent, or Firm—Max Fogiel

[57] ABSTRACT

When signals from an incremental transmitter are being evaluated, noise may distort the signals and the subsequent stages connected to the transmitter may therefore be incorrectly controlled. The invention discloses a process for suppressing the noise, thereby permitting correct evaluation. In the process, the signals at the outputs of the incremental transmitter are sampled at high frequency and stored in an intermediate store. They are then checked to ascertain whether a predetermined sequence of output signals exists. Since this predetermined sequence is not respected in the event of interferences, no signal is produced. A signal is produced only when the predetermined sequence is respected. The process can be applied wherever it is desired to obtain an undistorted output signal using an incremental transmitter of simple design.

11 Claims, 3 Drawing Sheets

PROCESS FOR EVALUATING SIGNALS FROM AN INCREMENTAL TRANSMITTER

BACKGROUND OF THE INVENTION

The present invention concerns a process for evaluating signals from an incremental generator. An incremental generator is a component employed to digitally operate controls. It consists, for example, of a pulse generator in the form of a disk with a series of alternately optically and mechanically sensed indications on it that emit pulses when the component is activated, by rotating the disk for example. To make it possible to detect the direction that the disk is rotating in, the indications are radially displaced, such that two phase-shifted signals, in the form of square pulses for example, can be obtained at two output terminals of the generator. The direction that the disk is rotating in can then be detected by the phase of the two signals emerging from the generator. The pulses from one output terminal are employed to incrementally adjust controls that emit a control voltage that can be discontinuously varied higher or lower. The series of pulses obtained from the generator are processed such that every positive edge, for example, will vary a control parameter up or down to a prescribed extent.

Simple incremental generators, however, involve the drawback that the pulses they emit have noise at their edges that occurs when the equipment is jolted for example. The result is, for example, that every positive edge will vary one increment, that the controls will accordingly be varied to different extents even though the generator is set constant, and that several increments forward or backward for example will be processed even though only one pulse should have been generated and the generator is to be adjusted in only one direction.

SUMMARY OF THE INVENTION

The object of the invention, therefore, is to eliminate the effect of jolting on the very noisy switching edges of the pulses from a simple incremental generator in order to ensure unambiguous processing of the signals.

The invention will now be specified with reference to one embodiment by way of example.

DESCRIPTION OF THE PREFERRED EMBODIMENTS

Figure 1:
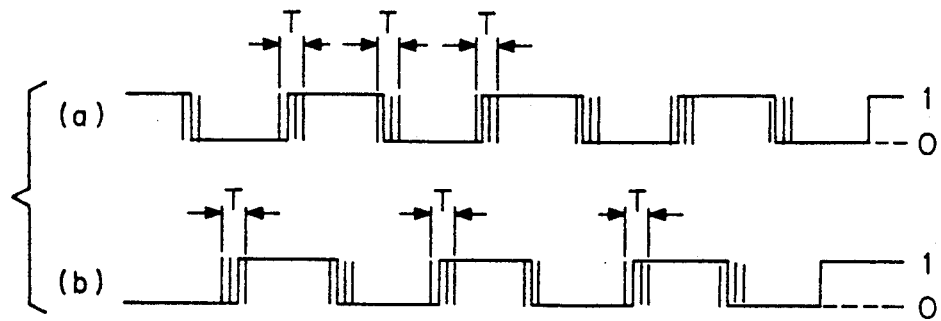
FIG. 1 comprises graphs of the pulses derived from an incremental generator in accordance with the present invention.

FIG. 1 is a graph of pulses representing the signals at the output terminals A and B of an incremental generator. Since the point of departure for the present invention is a generator with output signals that are subject to jolting, the signals are subject to noise especially in the vicinities T of their edges. The jolting make decoding difficult or impossible without special measures being taken. These measures, however, are expensive. The process that will now be described is employed to avoid the expense. The process will now be described with reference to FIG. 2. It should be noted that the different stages of the process can easily be governed by a microprocessor, eliminating material costs in that the requisite program can be stored as will be explained hereinafter with reference to FIG. 4.

Figure 2:
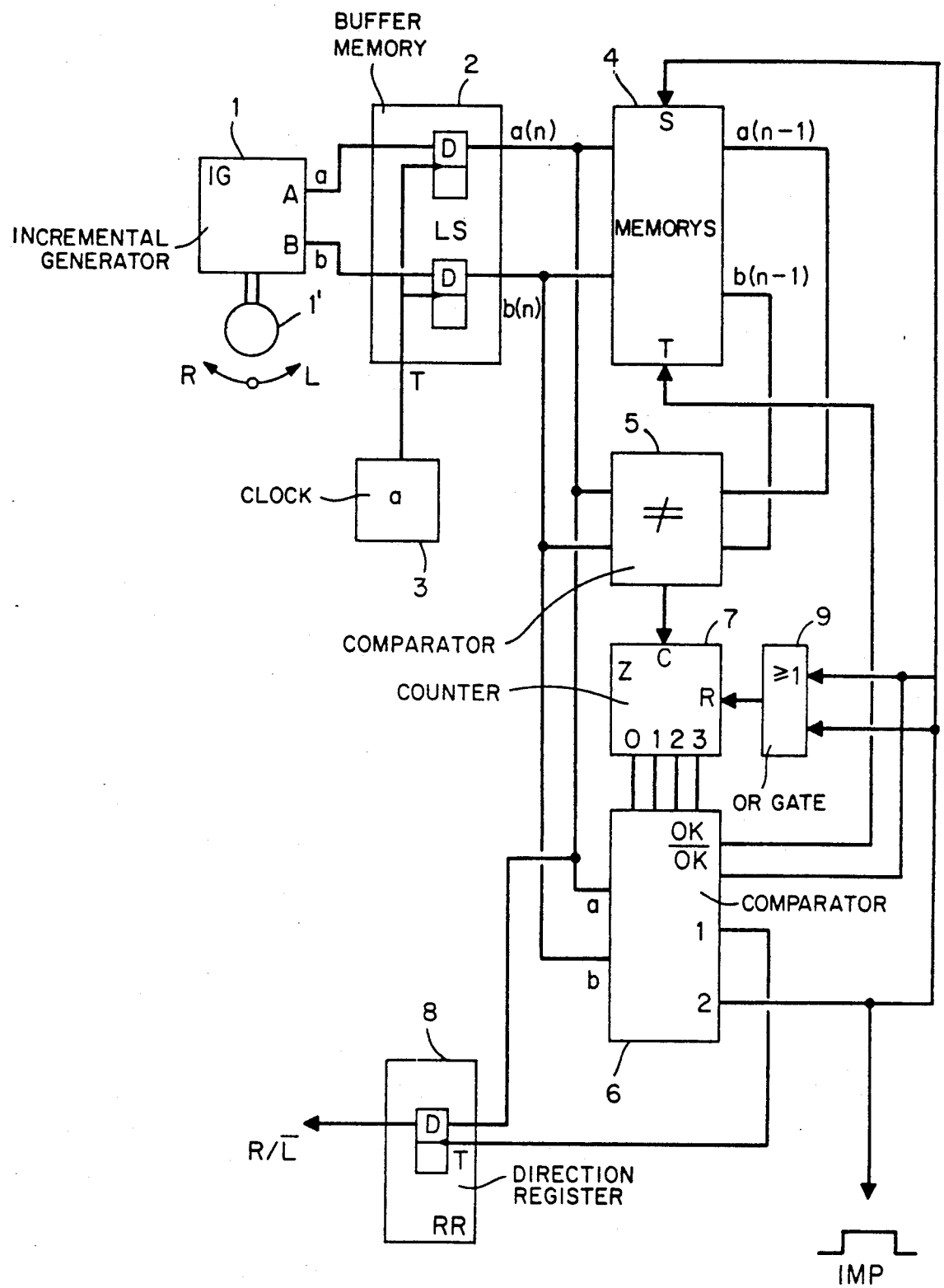
FIG. 2 is a block diagram illustrating the apparatus.

The signals a and b represented in FIG. 1 are at the output terminals A and B of the incremental generator 1 illustrated in FIG. 2. The sequence of signal illustrated in FIG. 1 occurs only when the generator is activated by means of knob 1', while incremental generator 1 is being adjusted. Otherwise any combination of 0 and 1 will be present at output terminals A and B. The incremental generator will release the following combinations, by way of example, to output terminals A and B in accordance with a rotation R to the right or L to the left: the sequence 00, 01, 11, 10, 00, . . . for one direction and the sequence 00, 10, 11, 01, 00, . . . for the other direction. It will be evident from this example that, no matter what direction the knob is turned in, the output signals will always occur in accordance with the sequence $a=b=0$, $a \neq b$, $a=b=1$, $a \neq b$, $a=b=0$, ... Non-maintenance of this sequence is an indication that the series of signals has been interfered with at one of the output terminals A and B. This criterion is interpreted as will now be described.

The signal states a and b at output terminals A and B vary with a frequency that depends on how incremental generator 1 is operated, i.e., on the speed at which knob 1' is rotated, for instance. The signal states are supplied to a buffer memory 2 that is triggered at a rate derived from a clock 3. The clock rate should be at least four times as high as the highest signal frequency generated by incremental generator 1. When the knob is rotated rapidly, the frequency can be 5 KHz for example, and the clock rate should be at least 20 KHz. The signal states a(n) and b(n) read out from buffer memory 2 are compared in a comparator 5 with the states a(n−1) and b(n−1) obtained in a previous polling process and stored in a memory 4. Whether and when previous signal states a(n−1) and b(n−1) are stored in memory 4 is dictated by another comparator 6 that will be discussed hereinafter. If signal states a(n) and b(n) differ from signal states a(n−1) and b(n−1), which will occur while the incremental generator is being adjusted, a pulse is released to a counter 7 that can assume four different states 0, 1, 2, and 3, for example.

Counter 7, by way of its output terminals, discontinuously activates comparator 6, which monitors to ensure that the sequence of signal states a and b from incremental generator 1 is correct. If the sequence is correct, a signal is released at output terminal OK. This signal provides a takeover pulse to the input terminal T of memory 4, preparing the current signal state for comparison in comparator 5 with the next signal state to arrive. If the sequence is incorrect, a signal arrives at output terminal OK. This signal rezeroes counter 7 by way of an OR gate 9, and sets memory 4 at a definite out of 0, 1 or 1, 0, for example. The sequence of signal states continues to be monitored as counter 7 is advanced. Once the situation $a \neq b$ has been identified, a direction register 8 that indicates the direction in which incremental generator 1 is being varied is activated through input terminal T. Direction register 8 consists, for instance, of a D flip-flop. Comparator 6 then monitors the state $a=b=1$. At the subsequent state, $a \neq b$, the clock is rezeroed and a non-disturbed pulse IMP is released.

Figure 3:
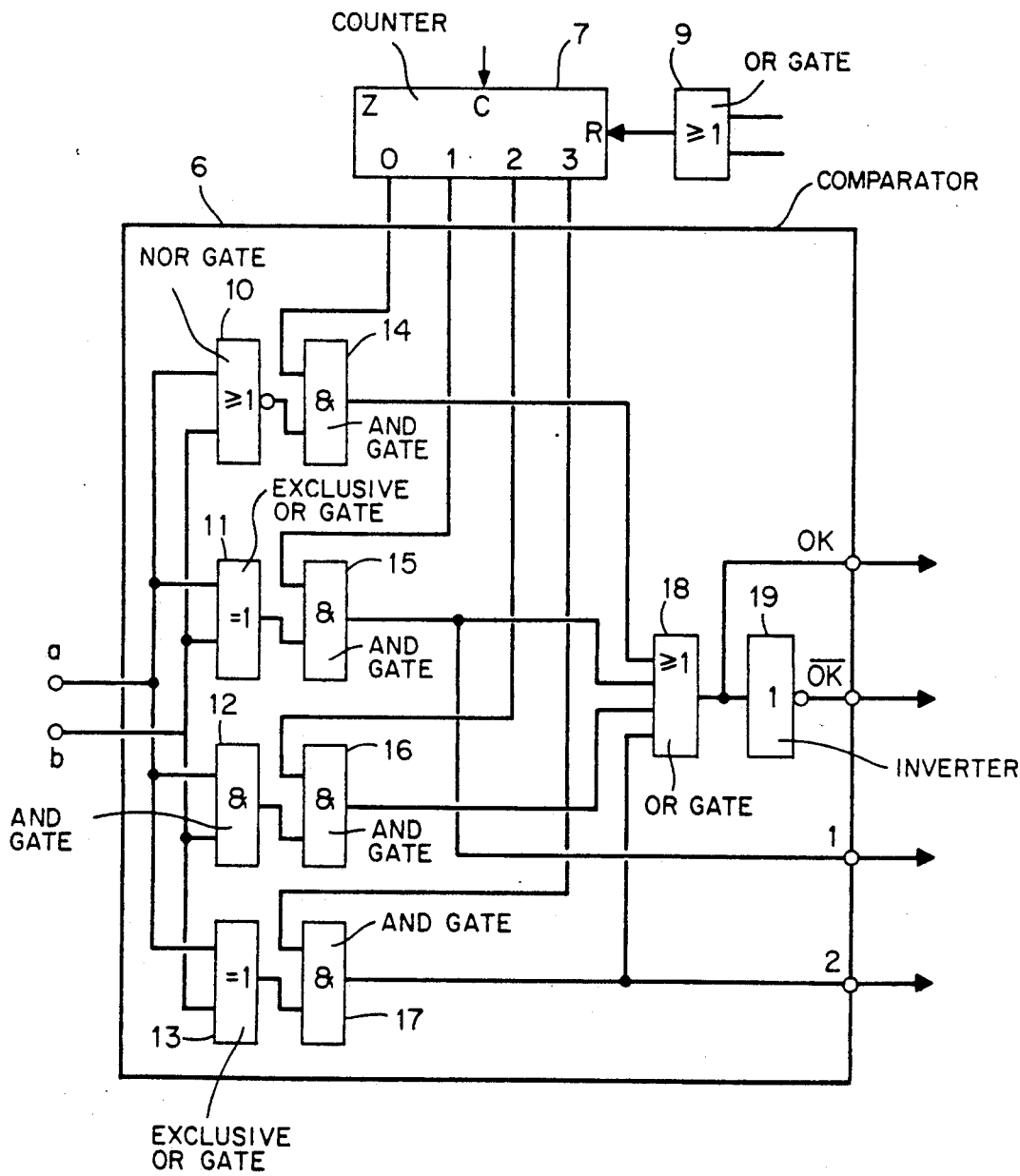
FIG. 3 is a detail of the block diagram in FIG. 2.

One possible circuit is illustrated in FIG. 3 to help explain how the comparator 6, illustrated in FIG. 2, operates. Signal states a and b are supplied in parallel to four logical gates—a NOR gate 10, and exclusive-OR gate 11, and AND gate 12, and an exclusive-OR gate 13. These gates are switched in a cyclical sequence by the output terminals 0, 1, 2, and 3 of counter 7 through AND gates 14, 15, 16, and 17. Whenever the logical relationship is fulfilled at times dictated by the output terminals of the counter, a signal will arrive by way of an OR gate 18 at the output terminal OK of comparator 6. Otherwise, a signal will arrive at the output terminal -OK of comparator 6 by way of an invertor 19. If the correct sequence is maintained, a signal will always be present at output terminal OK and output terminal 2 will release a pulse IMP. If the signal states are disturbed, the prescribed sequence will not result and there can be no pulse at output terminal 2.

Figure 4:
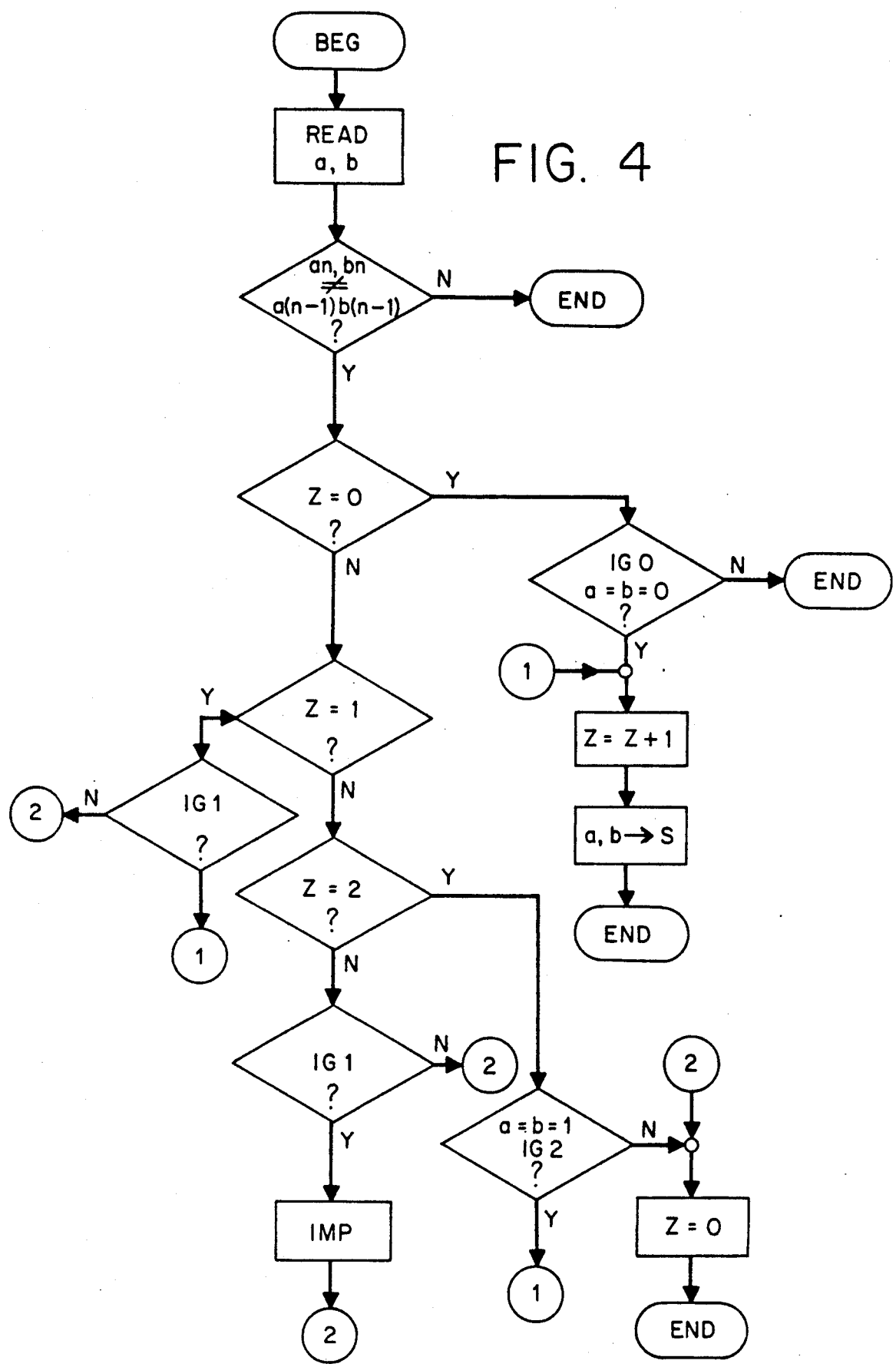
FIG. 4 is a flow chart illustrating how the process operates.

As indicated at the beginning of this description, the process, which has been explained with reference to a circuit, can also be carried out in the form of a program, which will now be described with reference to FIG. 4.

At the commencement of the program, the incremental generator is read out and, in a subsequent step, the signal states are compared with a previously stored value. If identity is determined, the program skips back to start. If non-identity is determined, which is an indication to activate the incremental generator, continuous testing is conducted to determine whether the various states correspond to the correct sequence. An initial poll queries whether the counter is emitting the state $Z=0$. If it is, a test is conducted to determine whether the incremental generator is emitting the state IG0. If no state IG0 is detected, the program will return to start. If state IG0 is detected, the next state $Z=Z+1$ is established and the program commences with a new poll. The new poll determines whether $Z=1$ has been established. If so, a test is conducted to determine whether a state IG1 is present. IG1 indicates that outputs a and b are different. If not, state $Z=0$ is established and the program returns to start. If IG1 is detected, state $Z=Z+1$ is established, the values for a and b are again entered in memory 4, and the program returns to start. Another poll is conducted to determine whether the state $Z=2$ is present. If it is, a test is conducted to determine whether state IG2 has been attained. IG2 indicates that both outputs a and b are 1. If no IG2 is detected, state $Z=0$ is established again and the program returns to start. If state $Z=2$ is negated, a poll is conducted to determine whether $Z=3$ and it is then determined whether IG1 is present again, indicating that both outputs a and b are different. If so, a pulse IMP is released, the program returns to start, and processing commences again. It will be evident that no pulse IMP can be generated unless the sequence of signals a and b is 00, 01(10), 11, 10(01).

Incremental generators of this type can be employed to control volume, high or low audio frequencies, and even balance in a low-frequency amplifier, to adjust the frequency of a radio or television receiver, to operate in a search mode, or to control tracking in playing a compact disk in a compact-disk player. An incremental generator of this type can also be employed to advantage for the search mode or to adjust the timer of a video recorder. It can, to provide a further example, also be employed as a speed and direction sensor in vehicles of any kind.

I claim:

1. A method for distinguishing between a signal pulse and a noise pulse emitted by an incremental generator supplying noise pulses contained within signal pulses, comprising the steps: adjusting an incremental generator to supply a sequence of pulses at output terminals of said generator so that said pulses have a signal frequency dependent on operation of said generator; comparing states of successive pairs of pulse sequences emitted from said output terminals of said generator; and testing with logic means the states of said pulse sequences at said output terminals to determine whether said pulse sequences correspond to a predetermined sequence a pulse in a pulse sequence being identified as a signal pulse first after the pulse sequence corresponds to the predetermined sequence to distinguish from a noise pulse, periodically polling the states at said output terminals of said generator; temporarily storing polled output states of said generator in a first memory; and releasing the states stored in said first memory to a second memory when the pulse sequence corresponds to said predetermined sequence.

2. A method as defined in claim 1, including the step of polling said first memory at a rate which is at least four times as high as said signal frequency supplied by said incremental generator.

3. A method as defined in claim 1, including the step of comparing current states read out of said first memory with states of a previous pulse sequence read out of said second memory.

4. An arrangement for distinguishing between a signal pulse and a noise pulse, comprising: an incremental generator emitting said signal pulse and said noise pulse, noise pulses being contained within signal pulses supplied by said generator; means for adjusting said incremental generator to supply a sequence of pulses at output terminals of said generator so that said pulses have a signal frequency dependent on operation of said generator; means for comparing states of successive pairs of pulse sequences emitted from said output terminals of said generator; and logic means for testing the states of said pulse sequences at said output terminals to determine whether said pulse sequences correspond to a predetermined sequence; a pulse in a pulse sequence being identified as a signal pulse first after the pulse sequence corresponds to the predetermined sequence to distinguish from a noise pulse.

5. An arrangement as defined in claim 4, including means for periodically polling states at said output terminals of said incremental generator first memory means for temporarily storing polled states at said output terminals; and second memory means for receiving contents of said first memory means when the pulse sequence is correct; said first memory means being polled at a rate which is at least four times as high as the highest signal frequency supplied by said generator; and comparator means for comparing current states read out of said first memory means with states of a previous pulse sequence read out of said second memory means.

6. An arrangement as defined in claim 4, including means for periodically polling states at said output terminals of said generator; first memory means for temporarily storing the states polled periodically; and second memory means for receiving contents of said first memory means when the states of said pulse sequence corresponds to said predetermined sequence.

7. An arrangement as defined in claim 6, wherein said first memory means is polled at least four times as high as the highest signal frequency supplied by said generator.

8. An arrangement as defined in claim 6, including comparator means for comparing current states read out of said first memory means with states of a previous pulse sequence read out of said second memory means.

9. A method for distinguishing between a signal pulse and a noise pulse emitted by an incremental generator supplying noise pulses contained within signal pulses, comprising the steps: adjusting an incremental generator to supply a sequence of pulses at output terminals of said generator so that said pulses have a signal frequency dependent on operation of said generator; transmitting said sequence of pulses from said output terminals to a buffer memory; triggering said buffer memory at a rate which is at least four times greater than the highest signal frequency in the output signal of said generator; storing signals read out of said buffer memory in an auxiliary memory during a polling procedure only if said signals are correct; comparing current signal states read out of said buffer memory with signal states in said auxiliary memory from a previous polling procedure; releasing a signal during said comparison step for activating discontinuously a comparator monitoring whether output signals from said generator are correct in corresponding to an edge of a signal pulse; and setting aid auxiliary memory to a predetermined state when a signal is incorrect by corresponding to a noise pulse; a pulse in a pulse sequence being identified as a signal pulse first after the pulse sequence corresponds to the predetermined sequence to distinguish from a noise pulse.

10. A method for distinguishing between a signal pulse and a noise pulse emitted by an incremental generator supplying noise pulses contained within signal pulses, comprising the steps: adjusting an incremental generator to supply a sequence of pulses of output terminals of said generator so that said pulses have a signal frequency dependent on operation of said generator; comparing states of successive pairs of pulse sequences emitted from said output terminals of said generator; and testing with logic means the states of said pulse sequences at said output terminals to determine whether said pulse sequences correspond to a predetermined sequence a pulse in a pulse sequence being identified as a signal pulse first after the pulse sequence corresponds to the predetermined sequence to distinguish from a noise pulse.

11. A method as defined in claim 10, including the steps of: periodically polling states at said output terminals of said incremental generator; storing temporarily the polled states in a first memory; and releasing contents of said first memory to a second memory when the pulse sequence is correct; polling said first memory at a rate which is at least four times as high as the highest signal frequency supplied by said incremental generator; and comparing current states read out of said first memory with states of a previous pulse sequence read out of said second memory.

* * * * *